United States Patent
Giroir et al.

(10) Patent No.: US 6,854,006 B1
(45) Date of Patent: Feb. 8, 2005

(54) SYSTEM AND METHOD FOR MERGING WEB BASED ON-DEMAND SNA APPLICATION SELECTION AND TN3270 CLIENT LAUNCHING

(75) Inventors: Didier Giroir, Cagnes sur Mer (FR); Olivier Hericourt, Cagnes sur Mer (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/469,046

(22) Filed: Dec. 21, 1999

(30) Foreign Application Priority Data

May 31, 1999 (EP) ............................................. 99480043

(51) Int. Cl.[7] ............................................. G06F 15/16
(52) U.S. Cl. ...................... 709/203; 709/217; 709/219; 709/227; 717/173; 717/178; 345/749
(58) Field of Search .............................. 709/203, 217, 709/219, 227, 201, 208–211, 218, 202, 228, 229; 717/173, 178; 345/749, 783, 810, 823, 835, 845, 860

(56) References Cited

U.S. PATENT DOCUMENTS

| | | | | |
|---|---|---|---|---|
| 4,893,307 A | * | 1/1990 | McKay et al. | 370/389 |
| 5,732,275 A | * | 3/1998 | Kullick et al. | 717/170 |
| 6,131,116 A | * | 10/2000 | Riggins et al. | 709/219 |
| 6,233,543 B1 | * | 5/2001 | Butts et al. | 703/27 |
| 6,295,075 B1 | * | 9/2001 | Janay et al. | 709/227 |
| 6,301,590 B1 | * | 10/2001 | Siow et al. | 715/500 |
| 6,327,662 B1 | * | 12/2001 | Araujo | 713/200 |
| 6,457,099 B1 | * | 9/2002 | Gilbert | 711/115 |

* cited by examiner

*Primary Examiner*—Zarni Maung
*Assistant Examiner*—Hassan Phillips
(74) *Attorney, Agent, or Firm*—McGuireWoods LLP; John R. Pivnichny (57) ABSTRACT

The present invention relates to the transmission of Systems Network Architecture (SNA) information through the Internet Protocol (IP) network, and more particularly to a method and system for an SNA application user to locally select a target application at its current location and to launch a preferred (or the more appropriate) Telnet 3270 Client to access this target application in a one-step process.

19 Claims, 7 Drawing Sheets

SYSTEM AND METHOD FOR MERGING WEB BASED ON-DEMAND SNA APPLICATION SELECTION AND TN3270 CLIENT LAUNCHING

TECHNICAL FIELD OF THE INVENTION

The present invention relates to the transmission of Systems Network Architecture (SNA) information through the Internet Protocol (IP) network, and more particularly to a method and system for users to locally select target applications and to access these target applications at their current locations through a preferred Telnet 3270 Client.

BACKGROUND ART

Environment
SNA-IP

Every day, for all sorts of reasons, more and more companies are focusing on the consolidation of the multiple specialized networks they directly operate or lease from service providers onto a single protocol network. These multiple specialized networks are based on diverse networking technologies such as Systems Network Architecture (SNA), Internet Protocol (IP) or Internetwork Packet Exchange (IPX). These companies are making this consolidation one of their top priorities and usually select IP (the Internet Protocol) as their protocol of choice. However, for many of these companies that are using SNA protocols and applications, there is a major requirement to retain access to the huge amount of existing corporate data residing in traditional mainframes and accessible through SNA applications.

Internet

The Internet is a global network of computers and computer networks (the "Net"). The Internet connects computers that use a variety of different operating systems or languages, including UNIX, DOS, Windows, Macintosh, and others. To facilitate and allow the communication among these various systems and languages, the Internet uses a protocol referred to as TCP/IP ("Transmission Control Protocol/Internet Protocol"). TCP/IP protocol supports three basic applications on the Internet:

transmitting and receiving electronic mail, logging into remote computers (the "Telnet"), and transferring files and programs from one computer to another ("FTP" or "File Transfer Protocol").

World Wide Web

With the increasing size and complexity of the Internet, tools have been developed to help find information on the network, often called navigators or navigation systems. The World Wide Web ("WWW" or "the Web") is a recent superior navigation system. The Web is:

an Internet-based navigation system, an information distribution and management system for the Internet, and a dynamic format for communicating on the Web.

The Web seamlessly integrates different formats of information, including still images, text, audio and video. A user on the Web using a graphical user interface may transparently communicate with different host computers on the system, and different system applications (including FTP and Telnet), and different information formats for files and documents including, for example, text, sound and graphics.

Uniform Resource Locators

A resource of the Internet is unambiguously identified by a Uniform Resource Locator (URL), which is a pointer to a particular resource at a particular location. A URL specifies the protocol used to access a server (e.g. HTTP, FTP,), the name of the server, and the location of a file on that server.

Hyper Text Transfer Protocol

Each Web page that appears on a client of the Web may appear as a complex document that integrates, for example, text, images, sounds and animation. Each Web page may also contain hyperlinks to other Web documents so that a user at a client computer using a mouse may activate a hyperlink jump to a new page (which is a graphical representation of another document file) on the same or on a different Web server.

A Web server is a software program on a Web host computer that answers requests from Web clients, typically over the Internet. The whole Web uses a language or protocol to communicate with Web clients that is called Hyper Text Transfer Protocol ("HTTP"). All types of data can be exchanged among Web servers and clients using this protocol, including documents formatted in Hyper Text Markup Language ("HTML"), and graphics, sounds and video data. HTML describes the layout, contents and hyperlinks of documents and pages. Web clients when browsing:

convert user specified commands into HTTP GET requests, connect to the appropriate Web server to get information, wait for a response. The response from the server can be the requested document or an error message.

After the document or an error message is returned, the connection between the Web client and the Web server is closed. The first version of HTTP is a stateless protocol. That is, there is no continuous connection between each client and each server. The Web client using HTTP receives a response as HTML data or as other data. This description applies to version 1.0 of the HTTP protocol, while the new version breaks this barrier of stateless protocol by keeping the connection between the server and client alive under certain conditions.

Browser

After receipt, the Web client formats and presents the data or activates an ancillary application such as a sound player to present the data. To do this, the server or the client determines the various types of data received. The Web Client is also referred to as the Web Browser, since it in fact browses documents retrieved from the Web Server.

Note: More explanations about the Internet can be found in the following publication incorporated herewith by reference: "Internet in a nutshell" by Valerie Quercia, published by O'Reilly, October 1997.

TN3270

Figure 3:
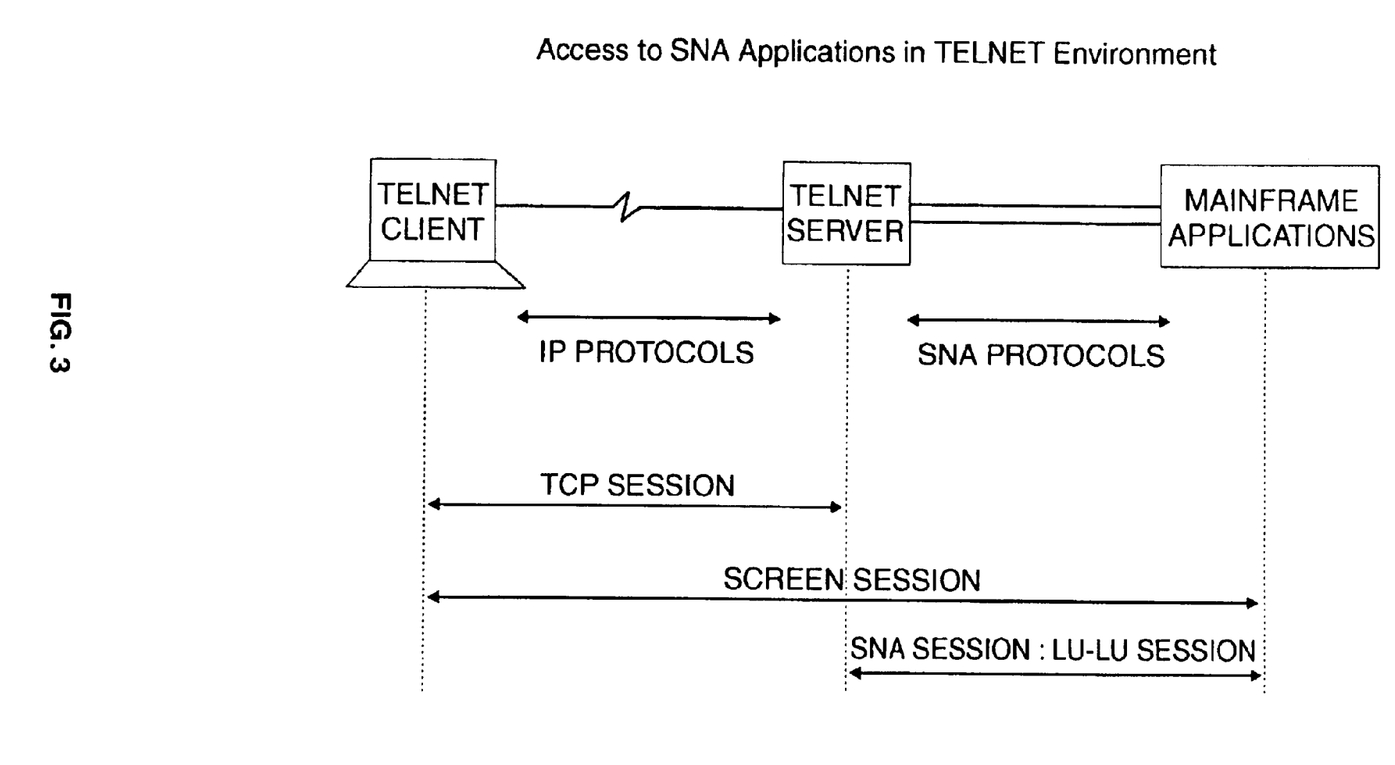
FIG. 3 shows an access to SNA Applications in a Telnet 3270 environment according to prior art.

In an IP environment, a widely used technique for the transport of SNA information across an IP network is the use of Telnet technologies (TN3270). This technique for SNA "green screen" workstation users is a Client/Server approach. "Host On Demand" from IBM or "WebClient" from CISCO are examples of Client software implementations. Network Utility from IBM or CISCO router's offerings are typical Server Implementations (hardware and software). The "Client" piece usually runs within the customer's workstation while the "Server" piece is usually placed in front of the customer's Data Center mainframes (or sometimes directly within the mainframe itself) or within the customer's branch offices. As illustrated in FIG. 3, IP protocols are used between the Server and the Clients, while traditional SNA protocols are used between the Server and the target Applications. More information concerning Telnet, TN3270 and Network Utility can be found In the following publications incorporated herewith by reference:

"IBM 2216/Network Utility Host Channel Connection", Erol Lengerli, Jacinta Carbonell, Thomas Grueter; IBM International Technical Support Organization, January 1999, SG24-5303-00.

"IBM Network Utility Description and Configuration Scenarios", Tim Kearby, Peter Gayek, Gallus Schlegel, Imre Szabo, Zhi-Yong Zhang; IBM International Technical Support Organization, January 1999, SG24-5289-00.

"Internetworking with TCP/IP-Volume 1-Principles, Protocols, and Architecture" Douglas E. Corner, Second Edition, Prentice Hall 1991.

Request For Comments (RFCs) from the Internet Engineering Task Force (IETF):

RFC 1576: TN3270 Current Practices,

RFC 1646: TN3270 Extensions for LU name and Printer Selection,

RFC 1647: TN3270 Enhancements,

RFC 2355: TN3270 Enhancements.

On Demand Clients

Figure 4:
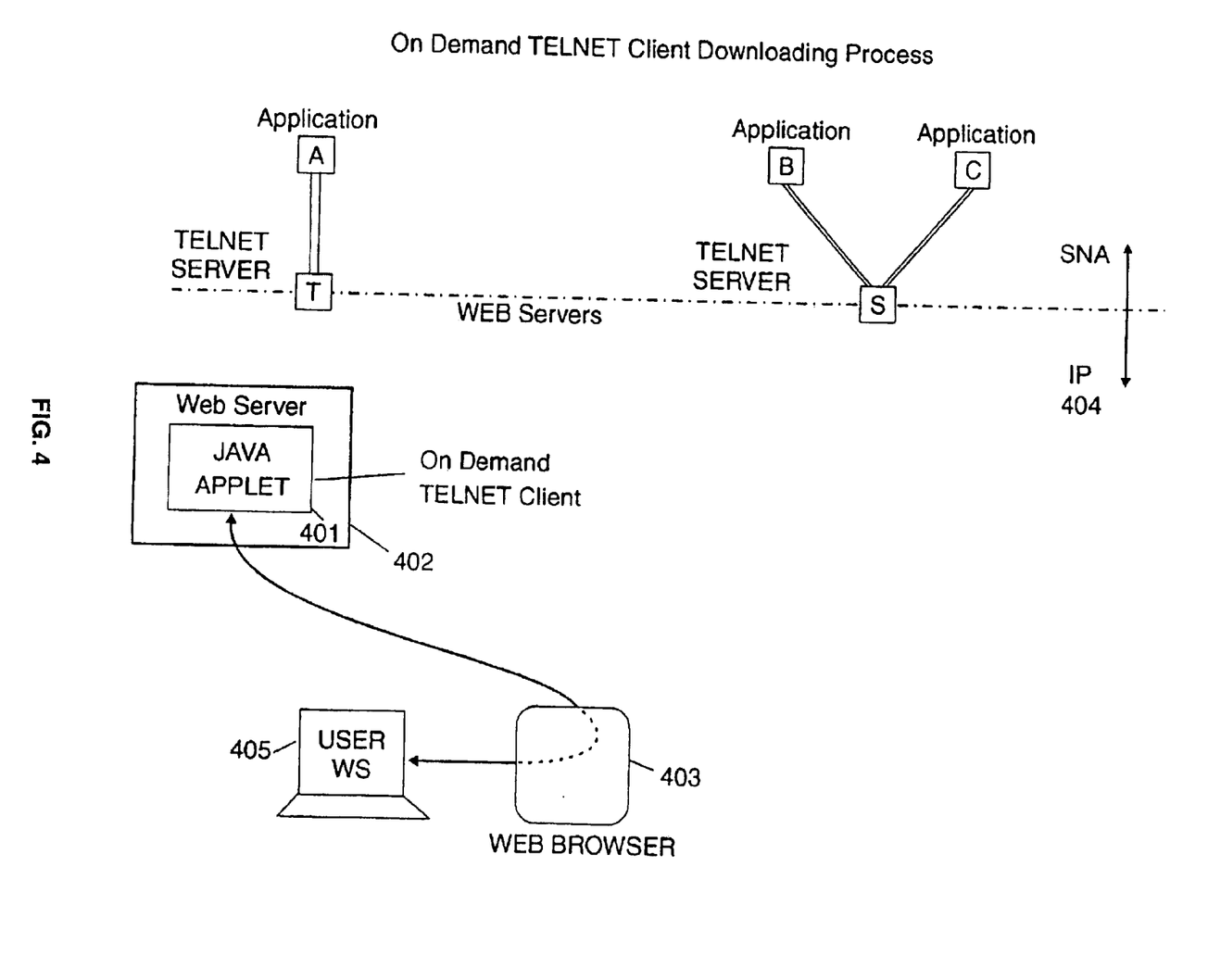
FIG. 4 shows how on-demand Clients are downloaded within a user workstation according to prior art.

As illustrated in FIG. 4, an on-demand Client (401) is a means by which SNA applications can be accessed from an Internet Browser (403). The on-demand Client is based on the Java language, and thus requires a Java-capable Browser (403). Nothing else is required in the Client workstation (405), except for a connection to the Internet or to another TCP/IP network (404). A TN3270 (or other Telnet such as TN5250) Client programmed in Java constitutes an on-demand Client. To use an on-demand Client, users need to be connected somewhere in the network to a Web Server (402) used as a Java Applet repository application. The TN3270 (or other Telnet) Java Applet is downloaded (406) from this Web Server (402) to the workstation (405). An on-demand Client allows Web users to access host programs without explicitly installing a permanent 3270 terminal emulator such as IBM's PCOMM on their workstation (405). A Java-capable Web Browser (403) is all that users need. Among the multiple advantages associated with on-demand services, one may list:

No end-user installation or configuration is required to establish a screen session;

The user browser remains available for concurrent Web use.

The distribution of emulator software updates with Java is cost-effective. By placing a new version of the Java Applet within the Web Server repository application, all user workstations using this Server will obtain the new version the next time they access the Web Server repository application.

An on-demand Client is Java-based, so users in different operating environments (whether they are using network computers, traditional personal computers, or advanced workstations) get the same look and feel.

A Java-based Application Programming Interface (API) for application development is available to customize desktops.

Note: More explanations concerning the Java language can be found in the following publication incorporated herewith by reference: "Java Network Programming" by Elliotte Rusty Harold, published by O'Reilly, February 1997.

Optionally, these downloadable on-demand TN3270 Clients may be saved within the user's workstation to avoid the downloading process when the version saved is the latest version available. When the locally saved version of the Client is started, there is some chit chat between the Client and the Web Server repository application used for on-demand Client downloading, to determine whether the locally saved version is the same as the version currently available on the Web Server:

If version levels match, the locally saved version and the version provided by the Web Server are identical and there is no need for a download.

If the version levels differ, the latest version from the Web Server is downloaded within the user's workstation and is locally saved. The latest version therefore replaces the older version.

This process saves time at invocation, as the Client is only downloaded in the case where a more up-to-date version has been placed within the Web Server. Saving the more recent copy of the Client within the user's workstation allows the Client to be run, even in the advent of a temporary failure or unavailability of the Web Server used for the on-demand Client downloading or in cases where the user does not want this downloading step to occur every logon time.

Application Selection Processor

Traditional SNA End-to-End

Figure 1:
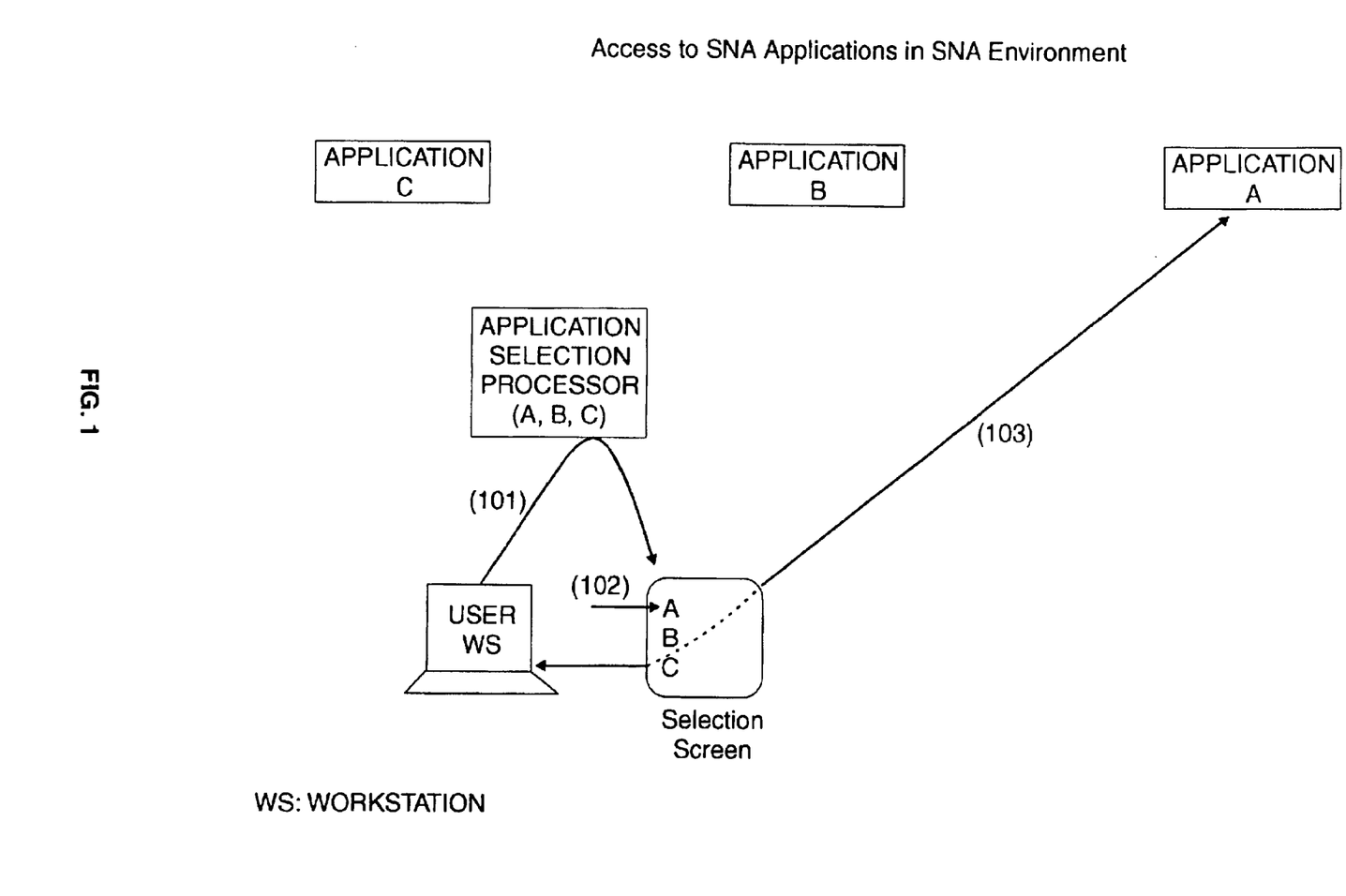
FIG. 1 shows a traditional SNA access to an application selection processor in an SNA environment.

In the SNA world, workstation users traditionally obtain access to their favorite SNA applications by connecting first to an intermediate application. This intermediate application (called the "application selection processor") provides a connection to the real target selection processor presents to the user a selection menu (called the "selection screen") of all the possible SNA applications that a user may access. FIG. 1 describes a traditional SNA access to an application selection processor in an SNA environment.

First step (101): The user is presented by the application selection processor a selection screen of a plurality of possible applications (three possible applications A, B and C are shown). Usually, the workstation (WS) automatically sets up a direct connection to the application selection processor, as soon as the workstation's SNA protocol stack is started (or in case of a "dumb" terminal, when the terminal is powered on).

Second step (102): Provided that at this time, the application selection processor is up and running, the connected user selects an application (application A) by typing an application name on the selection screen.

Third step (103): Finally, the user gets connected to the desired application (application A).

Telnet 3270 Based Approach

Figure 2:
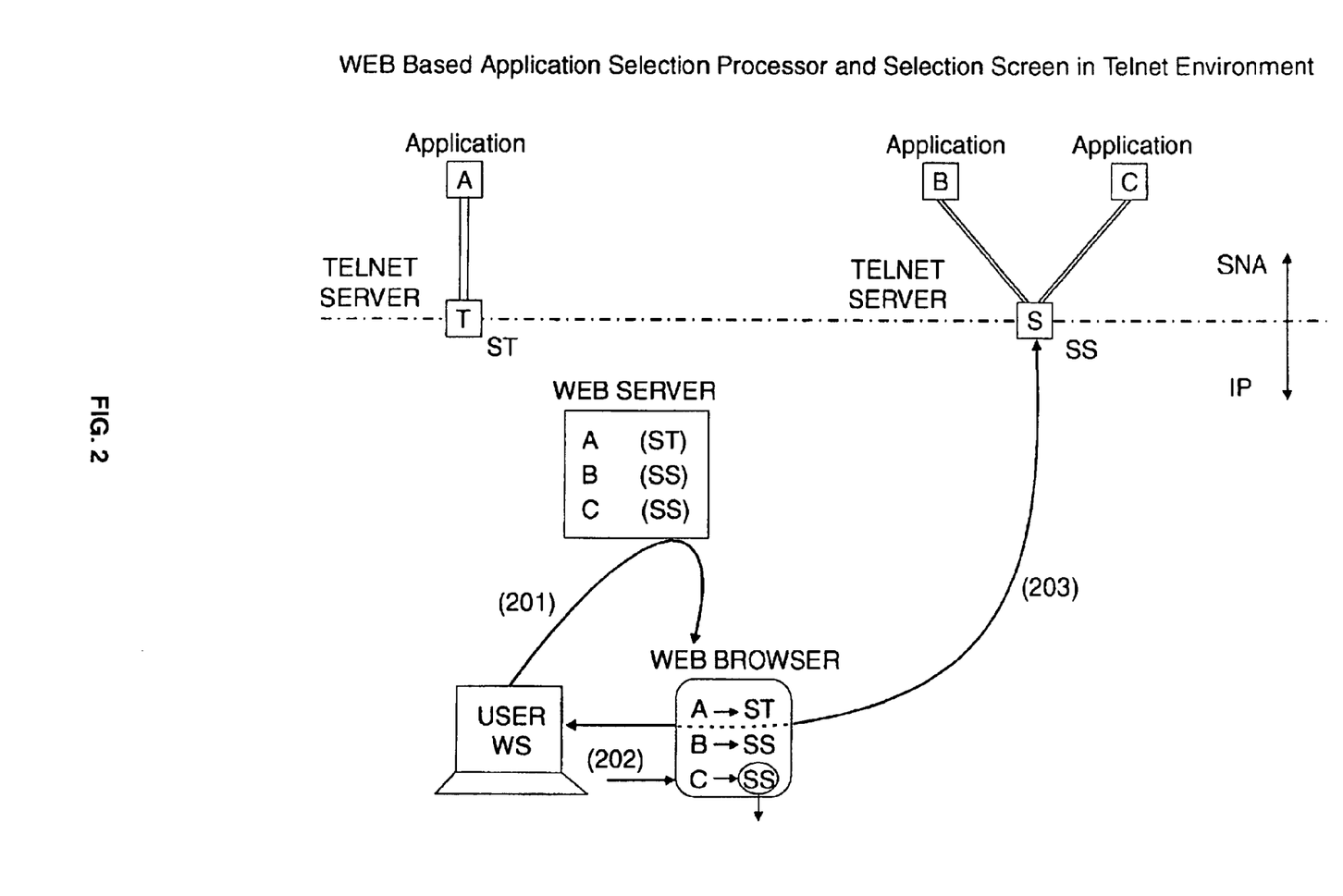
FIG. 2 shows Web based application selection processor and selection screen in a Telnet 3270 environment according to prior art.

In a TN3270 Client-Server approach, one technique is to provide the intermediate application selection processor via a Web Server implementation. In this case, the user accesses the application selection processor within the Web Server, using his favorite Web Browser. This approach is described in FIG. 2:

First step (201): The user gets from the application selection processor In the Web Server a selection screen with his favorite Web Browser listing three applications A, B and C. selection screen Second step (202): The user chooses application C from the selection screen and obtains back from the Web Server the address —SS—for the Telnet Server (S) providing access to the mainframe housing application C.

Third step (203): Then, the local Telnet Client may be started either manually or automatically to access the preferred Telnet Server by using the address provided by the application selection processor. The user gets back the address of the Telnet Server (Server S which address is SS) and connects to the target application C via the appropriate Server (Telnet Server S).

Going through an application selection processor, shields end-users from changes that inevitably occur, for example:

when an application is moved to a different Host, or when a new application is added.

In such cases, only the selection screen is modified and changes in target application locations are completely transparent to the workstations. The workstations are not impacted by changes in target application locations.

Another advantage is that users connect to a single intermediate application (the application selection processor) that provides an access point to the many possible SNA applications, wherever they are located. The use of an intermediate, menu-driven application selection processor greatly simplifies the task of the workstation users that automatically obtain access to an user friendly, menu driven, application selection menu (the selection screen) and are not concerned by manual definitions that need to be performed and maintained over changes.

On Demand Application Selection

Unpublished European patent application 99480019.7 entitled "Method and System for Local Application Selection with Customizable User Profiling" (Giroir et al.) relates to the transmission of Systems Network Architecture (SNA) information through the Internet Protocol (IP) network, and more particularly to a method and system for locally selecting an application from a Web Client in an Internet protocol (IP) network. A software package locally runs within user's workstations, for selecting applications across the network, wherever they are located. When this is required, the software is dynamically downloaded from one or a plurality of on-demand Application Selection Web Servers (an "application selection processor" Web Server repository application and a "selection screen" Web Server repository application) accessible via the Internet Protocol (IP) network. Two Web Servers are not required and the same Server may be used to provide both repositories, the application selection processor code and the associated selection screen (or set of screens). The method comprises the steps of:

- locally selecting in a Web Client an application by means of:
  - an application selection processor previously transferred from an application selection processor Web Server repository application;
  - a selection screen previously transferred from a selection screen Web Server repository application; and
  - accessing the selected application from the Telnet 3270 Client.

Problem

The very first time a workstation user needs to access SNA Applications, the user has to access the Web Server repositories to obtain the latest version of the application selection processor and the associated selection screen.

After completion of this step, the workstation user then proceeds with the selection of the target application.

Based on the result of selecting an SNA Application via the application selection processor, the workstation user then has to access another Web Server repository (the on-demand Client Web Server) to obtain the latest version of the Telnet Client emulator the workstation user decides to use (when several are possible), according to the type of the SNA Application to be accessed.

Once this step has been done, the Client may be started with the name/address of the preferred Telnet Server as input to access the target application that was selected on the first step.

All of these steps have to be done one after the other and the initialization of the application selection processor and selection screen and of the Web Clients is not transparent to the workstation user. In fact, the user needs to know (and needs to specify within the Web Browser) the Uniform Resource Locators (URLs) associated with all Web Server repositories (application selection processor and selection screen Web Server repositories, all the Web Servers repositories used to provide on-demand Clients) that have been used to implement the service.

Once this initialization process has been done, the workstation has saved the current versions of all the programs that have been downloaded from the Web Servers (or Web Server) repository applications. The chaining from SNA application Selection and Client launching with proper name/address of the preferred Telnet 3270 Server can be automated, provided there is a single Client used for all SNA applications, which is generally not the case for "heavy duty" SNA users.

OBJECTS OF THE INVENTION

It is an object of the present invention to make an application selection processor and an associated selection screen locally available and executable within a user's workstation.

It is a further object to chain the selection of applications with the selection of a preferred Client.

It is another object to launch the preferred TN3270 (or the more appropriate) Client to access selected SNA applications.

It is another object to shield users from the complexities associated with dealing with multiple Web Server repository applications.

SUMMARY OF THE INVENTION

The present invention relates to the transmission of Systems Network Architecture (SNA) information through the Internet Protocol (IP) network, and more particularly to a method and system for an SNA application user to locally select a target application at its current location and to launch a preferred (or more appropriate) Telnet 3270 Client to access this target application in a one-step process. The method comprises the steps of:

- downloading a kernel applet from a kernel applet repository, the kernel applet comprising means for accessing from the workstation an application selection processor repository, a selection screen repository, and one or more client repositories;
- downloading by means of the kernel applet an application selection processor from an application selection processor repository;
- downloading by means of the kernel applet a selection screen from a selection screen repository for locally selecting an application;
- locally selecting an application by means of the application selection processor and the selection screen;
- determining a client for accessing the selected application;
- downloading by means of the kernel applet a client applet or a client flat file from the client repository containing the necessary parameters for accessing the selected application;
- launching the client within the workstation; and
- accessing the selected application using this client.

DRAWINGS

The novel and inventive features of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

PREFERRED EMBODIMENT OF THE INVENTION

Extension of Networks

To remain competitive, network users are extending their traditional internal SNA and IP networks outward to business partners, dealers, suppliers, and customers. In this expanding environment, users are also searching for ways to save money and provide connectivity between their mix of SNA and TCP/IP Server applications and their TCP/IP and SNA desktop Client population.

Consolidation of Networks

Many companies today are considering the consolidation of their WAN traffic onto a single IP-only backbone. At the same time, other companies are simplifying their workstation configurations and attempting to run only the TCP/IP protocol stack at the desktop. However, most of these companies still require access to SNA hosts.

TN3270

TN3270 meets these requirements by allowing the end user to run IP from the desktop over the network and attach to a SNA host through a TN3270 Server. The clients connect to the Server using a TCP connection. The Server provides a gateway function for the downstream TN3270 clients by mapping the Client sessions to SNA-dependent LU—LU sessions that the Server maintains with the SNA host. The TN3270 Server handles the conversion between the TN3270 data stream and an SNA 3270 data stream.

As mentioned above, the path from a TN3270 Client to the SNA host consists of:

1. A TCP connection over IP from the Client to the Server;
2. An SNA LU—LU session from the Server to the host;

Connecting to a host to establish an LU—LU session can be accomplished using a traditional subarea connection or an APPN connection.

To deploy a TN3270 solution, TN3270 Client software is installed on desktop workstations and TN3270 Server software is installed in one of several places discussed below. Client software is available from IBM and many other vendors, and runs on top of the TCP/IP stack in the workstation. A given Client product provides one of two possible levels of standards support:

Base TN3270 Client;

These clients conform to RFC 1576 (TN3270 Current Practices) and/or RFC 1646 (TN3270 Extensions for LU name and Printer Selection).

TN3270E Client

These clients conform to RFC 1647 (TN3270 Enhancements), and RFC 2355 (TN3270 Enhancements).

A Server implementation that can support TN3270E clients is called a TN3270E Server.

The TN3270 Server function can be placed in a variety of products and positions within a network, including:

in the SNA host itself;

in a router in front of the data host or within the network or in a specialized box within the network;

Kernel Applet

Figure 7:
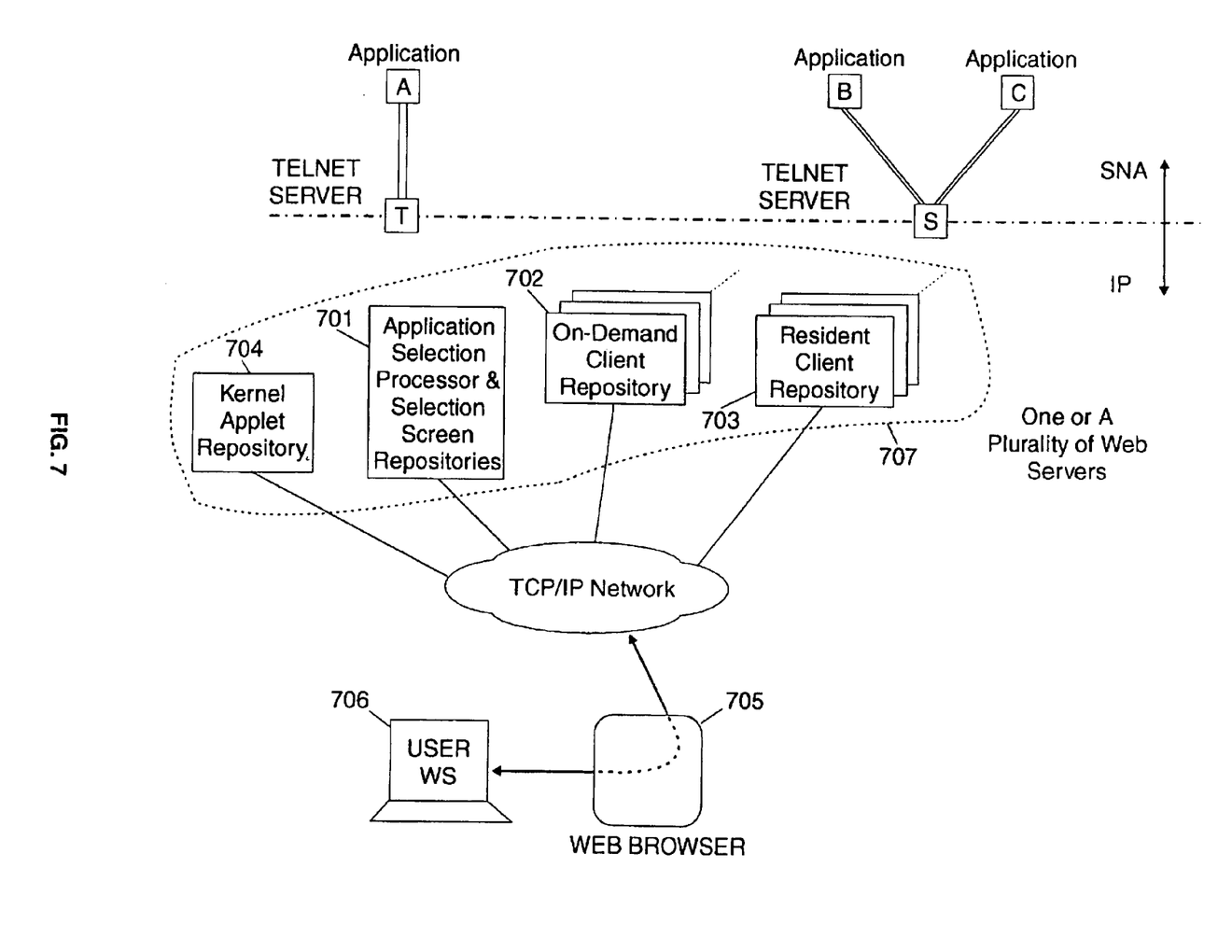
FIG. 7 is a view of the various repositories according to the present invention.

FIG. 7 is a general view of the system for merging SNA application selection and TN3270 Client launching according to the present invention. Two environments can be considered when a workstation user needs to access SNA applications. The first case is the first time this workstation accesses the service provided by the present invention, the second case is when the service has already been used and the workstation has been automatically set-up to facilitate the access to the service.

The Service is Accessed for the First Time

In this first case, the user starts the preferred (Java enabled) Web Browser (705), such as "Internet Explorer" from MICROSOFT or "Nestcape Communicator" from NETSCAPE, to access the Web Server repository (704) providing the service, using its Uniform Resource Locator (URL). Usually, such URLs used at initialization time are provided by the system administrators operating the Telnet 3270 service. From this Web Server repository (704), a Java Applet, which will be called "Kernel Applet" or "Kernel" for short is downloaded and saved within the user's workstation (706). When this Java Applet is started for the first time, it creates a shortcut on the user's workstation that will be used to access the service the next time access to SNA applications is required from this workstation (this corresponds to the automatic set-up to facilitate access to the service). The user's preferred Web Browser (705) is now known by the Kernel Applet as it is the Browser that has been used to download the Kernel Applet.

The Service has Already Been Accessed by the User's Workstation

In the second case, the user double clicks on the shortcut available on his desktop and corresponding to the access to SNA applications. In this case, there is no URL that needs to be specified because the Kernel Applet already has this information. This starts the Kernel Applet that is available locally within the user's workstation (706). This Kernel Applet accesses the Web Server repository (704) providing the service, using the user's preferred Web Browser (705), to verify whether or not the version of the Kernel Applet locally available within the user's workstation (706) is the latest version available. The latest version available is always the version that is provided by the Web Server repository (704). If this is not the case, the latest version of the Kernel Applet is downloaded from the Web Server repository (704) and saved in the user's workstation (706) to replace the older version and is started.

From this point on (for both cases described above), the latest version of the Kernel Applet is now locally available within the user's workstation, accessible via a shortcut from the workstation desktop and is currently running. The role of the Kernel Applet is to gather from the workstation the software levels (version numbers) of all the supported TN3270 or TN3270E Clients (702) that the user may have locally available within the workstation, such as "PComm" or "Host On Demand" from IBM or "WebClient" from CISCO. Telnet Clients may either be truly resident (703) within the workstation as regular installed software programs (this is the case for IBM's "PComm" for example) or could be locally saved versions of on-demand Clients that were earlier downloaded from a host (such as IBM's "Host On Demand" or CISCO's "Web Client").

Then, the Applet verifies if the application selection processor and the selection screen (701) are resident within the local workstation and determines their current version levels.

Application Selection Processor and Selection Screen

Figure 5:
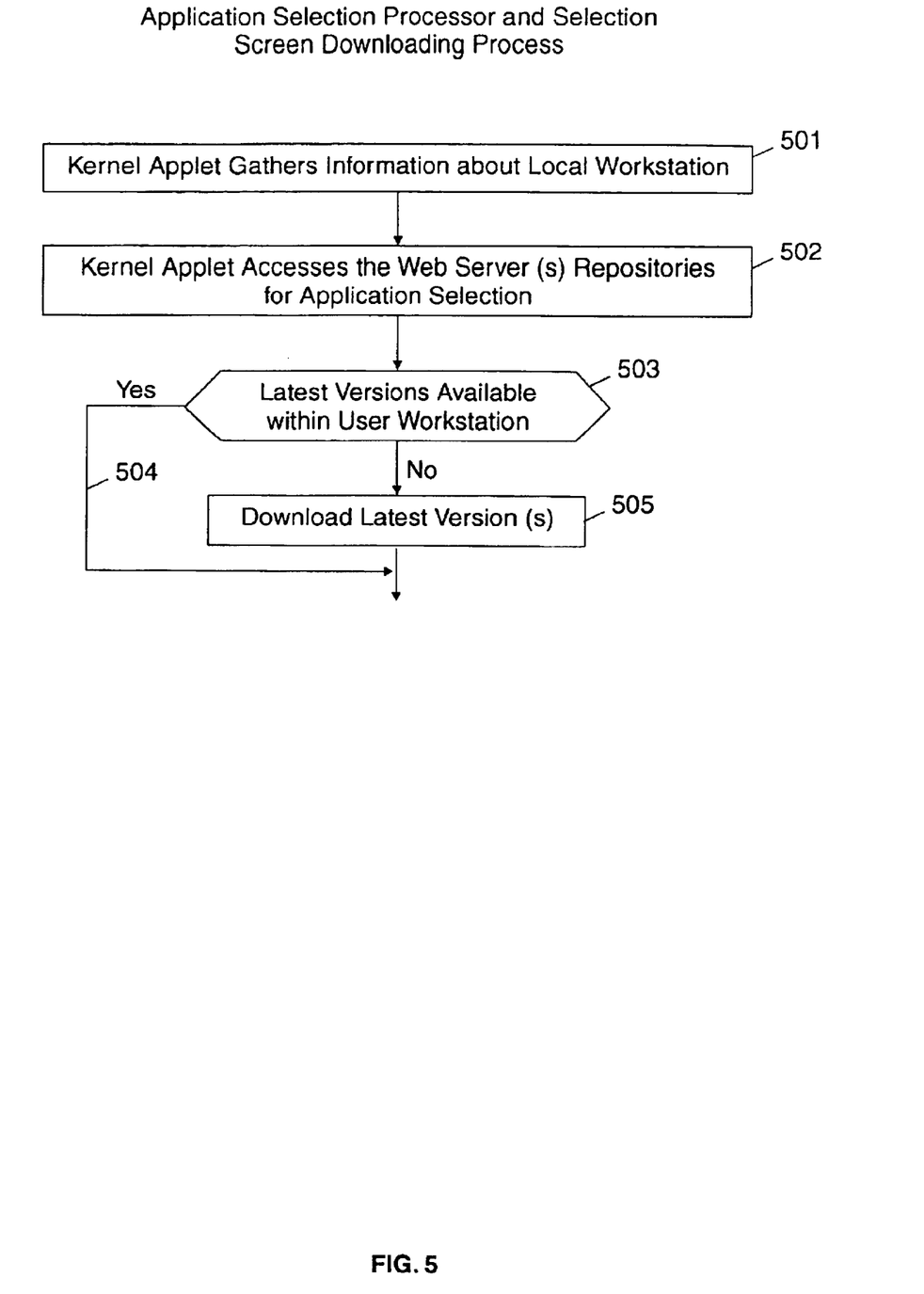
FIG. 5 is a flow chart of the process of downloading an application selection processor and the selection screen according to the present invention.

As illustrated in FIG. 5, based on the gathered information about the local workstation capabilities (501), the Kernel Applet accesses (502) the Web Server repositories (or Web Servers repositories as there can be one Web Server repository providing the application selection processor and another Web Server repository providing the selection screen) for Application Selection. This is done to obtain, if necessary, the latest versions of both the application selection processor and the selection screen. The Kernel Applet knows the URL required for these repositories, as these have been provided at the time the Kernel Applet has been downloaded. The workstation user is not involved with the manipulation of these URL(s). Two cases may occur (503):

The latest versions of both the application selection processor and the selection screen are already available within the user's workstation (706). In this first case no downloading is necessary (504).

The latest versions are not resident (505) within the workstation (or no version at all is yet available). In this second case, the latest versions needed (701) (either the application selection processor or the selection screen or both) are downloaded within the user workstation (706). Of course, the Kernel Applet is aware that new versions are now available locally when a download occurs.

Selecting the Target SNA Application

Once this process is completed, the application selection processor is started and the user is given the opportunity to select the desired target SNA application on the selection screen that has been created by the application selection processor. For each of the possible target SNA Applications, the selection screen contains the name/addressing information related to the preferred Telnet 3270 Server to access the target Application and the preferred Client to be used for this screen session. Based on the user's choice of the target SNA Application, the more optimal TN3270 Client to be used to access the selected SNA Application is determined by the application selection processor as this is dependent on the type of application that has been selected. Also determined is the address/name of the preferred TN3270 Server to use to access the desired application.

The Client

Figure 6:
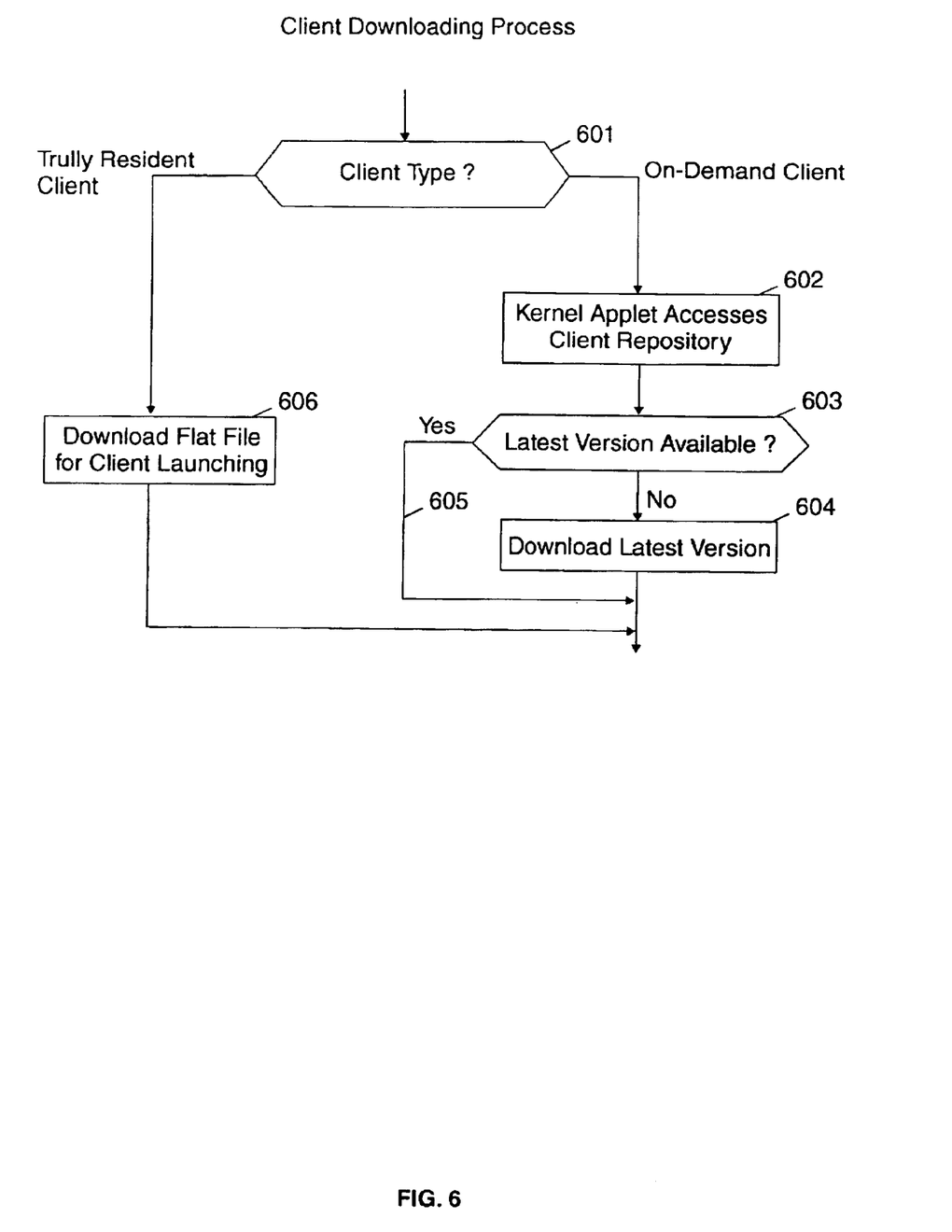
FIG. 6 is a flow chart of the process of launching the preferred Client according to the present invention.

As illustrated in FIG. 6, two cases may occur, depending on the type of Client that has been determined from the selection screen (601), on-demand Clients or truly resident Clients.

On Demand Clients

For an on-demand Client, the Kernel Applet accesses the Web Server repository (702) used to download this type of on-demand Client (602). The Kernel Applet verifies that the version of the on-demand Client within the workstation (706), if one is present, is the same than the version within the Web Server. The Kernel Applet knows the URL required for all the possible on-demand Client repositories. As these URLs have been provided at the time the Kernel Applet has been downloaded, the workstation user is not involved with the manipulation of these URL(s). Based on the gathered information about the local workstation capabilities and status, the Kernel Applet accesses the Web repository (702) providing the on-demand Client downloading to obtain, if necessary, the latest version of the Client. Two cases (603) may occur:

The latest version of the Client is already available within the user's workstation (706). In this first case no downloading is necessary (605).

The latest version is not resident within the workstation (or no version at all is yet available). In this second case, the latest version (702) is downloaded within the user workstation (604). Of course, the Kernel Applet is aware that a new version of this Client is now available locally.

Truly Resident Clients

For other Clients such as "PComm", the flat file required for Client launching is downloaded from the Web Server repository (703) or repositories providing such files required by resident Clients (606).

Optionally, it is possible to implement on-demand downloading of the flat file, which is then locally saved within the user workstation. When a truly resident Client needs to be launched, the Web Server repository (703) is used to verify that the latest version of the file is locally available (or simply that a local copy exists within the workstation). When this is the case, the local copy is used; if not, the flat file is downloaded (and locally saved). This presents the advantage of being able to launch the Client from the workstation, even in the case where the Client repository is not available.

Accessing the Target SNA Application

Once the previous steps have been completed, the selected Client is started with all the required information necessary to access the target application, including the address/name of the preferred TN3270 Server.

Advantages of the Present Invention

The present invention provides the capability to shield workstation users from multiple Web Servers repository applications. All a user needs to know and specify to a (preferred) Web Browser (705) is the address (URL) of the Web Server repository application that implements the system and method described by the invention. All other repositories are hidden to the workstation user. This simplifies users lives and eases system administration of addressing/naming information that needs to be performed for any network. All the complexities associated with a user dealing with the selection of Applications via the application selection processor and associated selection screen and all possible TN3270 Clients, whether they are on-demand or truly resident, is dramatically reduced.

Additionally, the workstation user does not need to select the preferred Client for the target SNA Application. This information is included in the selection screen that includes the preferred Telnet Server addressing or naming information and the preferred Telnet Client to use for this target SNA application. This preferred Client is automatically downloaded to the user workstation if not already present and invoked as soon as the target application has been selected by the user from the selection screen.

As illustrated in FIG. 7, multiple Servers (707) can be used as code repositories to implement the present invention (the same logic would apply if all of the following repositories were located in one single Web Server). The system according to a preferred embodiment comprises:

a Web Server providing the application selection processor and selection screen repositories (another implementation may choose to use two different Web Servers) (701);

one Web Server repository for each on-demand Client (702);

one Web Server repository per Client that is permanently resident (such as IBM's "PComm") within the user's workstation (703);

a Web Server repository providing the "Kernel" Applet (704).

While the invention has been particularly shown and described with reference to a preferred embodiment, it will be understood that various changes in form and detail may be made therein without departing from the spirit, and scope of the invention.

What is claimed is:

1. A method in a work station for selecting an application and launching a client in an Internet protocol (IP) network, said method comprising the steps of:
   downloading a kernel applet from a kernel applet repository, said kernel applet comprising means for accessing from said workstation an application selection processor repository, a selection screen repository, and one or more client repositories;
   downloading by means of said kernel applet an application selection processor from the application selection processor repository;
   downloading by means of said kernel applet a selection screen from the selection screen repository for locally selecting an application;
   locally selecting an application by means of the application selection processor and the selection screen;
   determining a client for selecting the application for selection;
   downloading by means of said kernel applet a client applet or a client flat file containing necessary access parameters from a client repository for accessing said selecting application;
   launching said client within said workstation; and
   accessing the selected application using said client.

2. The method according to claim 1, wherein the step of determining a client for accessing the selected application comprises the further step of:
   selecting a preferred client for the selected application.

3. The method according to claim 1, wherein said step of downloading a kernel applet comprises the further steps of:
   determining whether a kernel applet is locally available or not;
   if the kernel applet is not locally available, downloading said kernel applet from a kernel applet repository;
   if the kernel applet is locally available, determining whether said local kernel applet and the kernel applet in the kernel applet repository are the same or not;
   if the local kernel applet and the kernel applet in the kernel applet repository are not the same, replacing the local kernel applet by the kernel applet in the kernel applet repository.

4. The method according to claim 3, wherein said step of downloading an application selection processor comprises the further steps of:
   determining whether an application selection processor is locally available or not;
   if the application selection processor is not locally available, downloading said application selection processor from an application selection processor repository;
   if the application selection processor is not locally available, downloading said application selection processor from an application selection processor repository;
   if the application selection processor is locally available, determining whether said local application selection processor and the application selection processor in the application selection processor repository are the same or not;
   if the local application selection processor and the application selection processor in the application selection processor repository are not the same, replacing the local application selection processor by the application selection processor in the application selection processor repository.

5. The method according to claim 1, wherein said step of downloading a selection screen comprises the further steps of:
   determining whether a selection screen is locally available or not;
   if the selection screen is not locally available, downloading said selection screen from a selection screen repository;
   if the selection screen is locally available, determining whether said local selection screen and the selection screen in the selection screen repository are the same or not;
   if the local selection screen and the selection screen in the selection screen repository are not the same, replacing the local selection screen by the selection screen in the selection screen repository.

6. The method according to claim 1, wherein said client applet is an on-demand client, the step of downloading an on-demand client comprising the steps of:
   determining whether an on-demand client is locally available or not;
   if the on-demand client is not locally available, downloading said on-demand client from the on-demand client repository;
   if the on-demand client is locally available, determining whether said local on-demand client and the on-demand client in the on-demand client repository are the same or not; and
   if the local on-demand client and the on-demand client in the on-demand client repository are not the same, replacing the local on-demand client by the on-demand client in the on-demand client repository.

7. The method according to claim 1, wherein the client flat file for a resident client is an on-demand flat file, the step of downloading an on-demand flat file comprising the steps of:
   determining whether an on-demand flat file for the resident client is locally available or not;
   if the on-demand flat file is not locally available, downloading said on-demand flat file from the on-demand client repository;
   if the on-demand flat file is locally available, determining whether said local on-demand flat file and the on-demand flat file in the on-demand client repository are the same or not;
   if the local on-demand flat file and the on-demand flat file in the on-demand client repository are not the same, replacing the local on-demand flat file by the on-demand flat file in the on-demand client repository.

8. The method according to claim 1, wherein said client flat file is for a truly resident client.

9. The method according to claim 1, wherein the kernel applet repository, the application selection processor repository, the selection screen repository, and the one or more client repositories are located in a single web server or in a plurality of web servers.

10. The method according to claim 1, wherein the steps of downloading comprise the further steps of:
    accessing the repositories through a web browser.

11. The method of claim 10, wherein the step of downloading the kernel applet comprises the step of:
    in the web browser, receiving, preferably at initialization time, means for accessing the kernel applet repository.

12. The method according to claim 10, wherein the kernel applet and the client applet are coded in Java language and the web browser accessing the kernel applet repository and client applet repositories are Java enabled.

13. The method according to claim 1, wherein:

the selected application is a systems network architecture (SNA) application;

the client is a Telnet 3270 client; and the application is accessed through a Telnet 3270 server.

14. A system comprising means adapted for carrying out the method according to anyone of the preceding claims.

15. A kernel applet to be downloaded from a web server in a workstation, said kernel applet comprising:

means for accessing from said workstation an application selection processor repository a selection screen repository, and one or more client repositories, said repositories located in one or a plurality of web servers; and means for downloading from said one or plurality of web servers to said workstation an application selection processor, a selection screen, and one or a plurality of client applets and/or client flat files.

16. The kernel applet of claim 15, further comprising:

means for determining whether a kernel applet is locally available;

means for downloading said kernel applet from a kernel applet repository in a web server, if the kernel applet is not locally available;

means for determining whether said local kernel applet and the kernel applet in the kernel applet repository server are the same or not, if the kernel applet is locally available; and means for replacing the local kernel applet by the kernel applet in the kernel applet repository if the local kernel applet and the kernel applet in the kernel applet repository are not the same.

17. The kernel applet of claim 15, further comprising:

means for determining whether an application selection processor is locally available or not;

means for downloading said application selection processor from the application selection processor repository, if the application selection processor is not locally available;

means for downloading said application selection processor from an application selection processor repository, if the application selection processor is not locally available;

means for determining whether said local application selection processor and the application selection processor in the application selection processor repository, are the same or not if the application selection processor is locally available; and means for replacing the local application selection processor by the application selection processor in the application selection processor repository, if the local application selection processor and the application selection processor in the application selection processor repository are not the same.

18. The kernel applet of claim 15, further comprising:

means for determining whether a selection screen is locally available or not;

means for downloading said selection screen from a selection screen repository if the selection screen is not locally available;

means for determining whether said local selection screen and the selection screen in the selection screen repository are the same or not, if the selection screen is locally available;

means for replacing the local selection screen by the selection screen in the selection screen repository if the local selection screen and the selection screen in the selection screen repository are not the same.

19. The kernel applet of claim 18, wherein the selected application is a systems network architecture application, the client is a Telnet 3270 client, and the application is accessed through a Telnet 3270 server.

* * * * *